(12) United States Patent
Murata et al.

(10) Patent No.: US 12,362,549 B2
(45) Date of Patent: Jul. 15, 2025

(54) UNDERCARRIAGE WIRING MODULE AND ROUTING STRUCTURE OF UNDERCARRIAGE WIRING MODULE

(71) Applicant: SUMITOMO WIRING SYSTEMS, LTD., Yokkaichi (JP)

(72) Inventors: Takahiro Murata, Yokkaichi (JP); Naofumi Yamatake, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 208 days.

(21) Appl. No.: 18/014,041

(22) PCT Filed: Jul. 9, 2021

(86) PCT No.: PCT/JP2021/025883
§ 371 (c)(1),
(2) Date: Dec. 30, 2022

(87) PCT Pub. No.: WO2022/014477
PCT Pub. Date: Jan. 20, 2022

(65) Prior Publication Data
US 2023/0268725 A1  Aug. 24, 2023

(30) Foreign Application Priority Data
Jul. 13, 2020 (JP) ................. 2020-119758

(51) Int. Cl.
*H02G 3/22* (2006.01)
*B60R 16/02* (2006.01)

(52) U.S. Cl.
CPC .......... *H02G 3/22* (2013.01); *B60R 16/0215* (2013.01)

(58) Field of Classification Search
CPC ...... B60R 16/02; B60R 16/0215; B60K 7/007
See application file for complete search history.

(56) References Cited

U.S. PATENT DOCUMENTS

| | | | | |
|---|---|---|---|---|
| 1,922,493 | A | * 8/1933 | Murray | B60Q 1/52 439/15 |
| 4,383,148 | A | * 5/1983 | Arima | B60R 16/027 200/61.54 |
| 5,450,320 | A | 9/1995 | Tsubaki et al. | |
| 2007/0234559 | A1 | 10/2007 | Tokuda et al. | |
| 2008/0078317 | A1 | * 4/2008 | Furuya | B63H 20/08 114/144 R |

(Continued)

FOREIGN PATENT DOCUMENTS

| | | | | |
|---|---|---|---|---|
| CN | 107380258 | * | 8/2017 | ........... B60K 7/0007 |
| CN | 107895605 A | | 4/2018 | |

(Continued)

OTHER PUBLICATIONS

Aug. 22, 2023 Office Action issued in Japanese Patent Application No. 2020-119758.

(Continued)

*Primary Examiner* — Paresh Paghadal
(74) *Attorney, Agent, or Firm* — Oliff PLC

(57) ABSTRACT

An undercarriage wiring module includes: a wiring member connecting a vehicle body side apparatus and a vehicle wheel side apparatus; and a support member supporting the wiring member so that the wiring member goes through a steering rotation central axis.

4 Claims, 8 Drawing Sheets

(56) References Cited

U.S. PATENT DOCUMENTS

| | | | |
|---|---|---|---|
| 2009/0101429 A1* | 4/2009 | Williams | B62D 5/003 |
| | | | 180/402 |
| 2009/0321171 A1* | 12/2009 | Hakansson | B62D 1/183 |
| | | | 296/190.08 |
| 2013/0009450 A1 | 1/2013 | Suzuki et al. | |
| 2013/0234425 A1* | 9/2013 | Skowronek | B62D 1/16 |
| | | | 280/93.502 |
| 2013/0277128 A1 | 10/2013 | Gillett | |
| 2013/0284528 A1 | 10/2013 | Kawasaki et al. | |
| 2014/0318879 A1* | 10/2014 | Gillett | B62K 5/08 |
| | | | 180/167 |
| 2016/0083003 A1* | 3/2016 | Huang | B60R 25/007 |
| | | | 74/484 R |
| 2017/0369007 A1 | 12/2017 | Tamura et al. | |
| 2019/0077342 A1 | 3/2019 | Okamoto et al. | |
| 2019/0111865 A1 | 4/2019 | Tamura et al. | |
| 2019/0152505 A1* | 5/2019 | Hansen | B60R 7/043 |

FOREIGN PATENT DOCUMENTS

| | | | | |
|---|---|---|---|---|
| DE | 19756057 | * | 7/1999 | B62D 1/16 |
| DE | 19900083 | * | 7/2000 | B62D 1/16 |
| JP | H06-135253 A | | 5/1994 | |
| JP | 2005-271909 A | | 10/2005 | |
| JP | 2006-62388 A | | 3/2006 | |
| JP | 2006-240430 A | | 9/2006 | |
| JP | 2007-313984 A | | 12/2007 | |
| JP | 2008-308033 A | | 12/2008 | |
| JP | 2011-201375 A | | 10/2011 | |
| JP | 2013-147084 A | | 8/2013 | |
| JP | 2013-209016 A | | 10/2013 | |
| JP | 2015-137065 A | | 7/2015 | |
| JP | 2016-063608 A | | 4/2016 | |
| JP | 2016-088269 A | | 5/2016 | |
| JP | 2016-107659 A | | 6/2016 | |
| JP | 2017-190117 A | | 10/2017 | |
| JP | 2018-065545 A | | 4/2018 | |
| JP | 2020-104766 A | | 7/2020 | |
| WO | 99/30955 A1 | | 6/1999 | |
| WO | 2022014477 A1 | | 1/2022 | |

OTHER PUBLICATIONS

Dec. 5, 2023 Office Action issued in Japanese Patent Application No. 2020-119749.

Aug. 22, 2023 Office Action issued in Japanese Patent Application No. 2020-119761.

Sep. 7, 2021 International Search Report issued in International Patent Application No. PCT/JP2021/024731.

Sep. 7, 2021 International Search Report issued in International Patent Application No. PCT/JP2021/025916.

Sep. 7, 2021 International Search Report issued in International Patent Application No. PCT/JP2021/025917.

Sep. 14, 2021 International Search Report issued in International Patent Application No. PCT/JP2021/025883.

Sep. 28, 2021 International Search Report issued in International Patent Application No. PCT/JP2021/026063.

Jan. 17, 2023 International Preliminary Report on Patentability issued in International Patent Application No. PCT/JP2021/026063.

Jan. 17, 2023 International Preliminary Report on Patentability issued in International Patent Application No. PCT/JP2021/025883.

Jan. 17, 2023 International Preliminary Report on Patentability issued in International Patent Application No. PCT/JP2021/024731.

Jan. 17, 2023 International Preliminary Report on Patentability issued in International Patent Application No. PCT/JP2021/025916.

Jan. 17, 2023 International Preliminary Report on Patentability issued in International Patent Application No. PCT/JP2021/025917.

U.S. Appl. No. 18/013,629, filed Dec. 29, 2022 in the name of Murata et al.

U.S. Appl. No. 18/013,943, filed Dec. 30, 2022 in the name of Murata et al.

U.S. Appl. No. 18/013,714, filed Dec. 29, 2022 in the name of Murata et al.

U.S. Appl. No. 18/013,621, filed Dec. 29, 2022 in the name of Murata et al.

Jul. 4, 2023 Office Action issued in Japanese Patent Application No. 2020-119749.

Jul. 4, 2023 Office Action issued in Japanese Patent Application No. 2020-119748.

Jul. 25, 2023 Office Action issued in Japanese Patent Application No. 2020-119752.

Dec. 26, 2023 Office Action issued in Japanese Patent Application No. 2020-119761.

Dec. 4, 2024 Office Action issued in U.S. Appl. No. 18/013,621.

Oct. 18, 2024 Office Action issued in Chinese Patent Application No. 202180046018.3.

Sep. 5, 2024 Office Action issued in U.S. Appl. No. 18/013,621.

Mar. 5, 2025 Notice of Allowance issued in U.S. Appl. No. 18/013,621.

Mar. 27, 2025 Office Action issued in U.S. Appl. No. 18/013,943.

Mar. 27, 2025 Office Action issued in Japanese Patent Application No. 2024-072822.

Apr. 8, 2025 Office Action issued in Chinese Patent Application No. 202180046018.3.

Jun. 3, 2025 Office Action issued in Japanese Patent Application No. 2020-119758.

* cited by examiner

F I G. 5
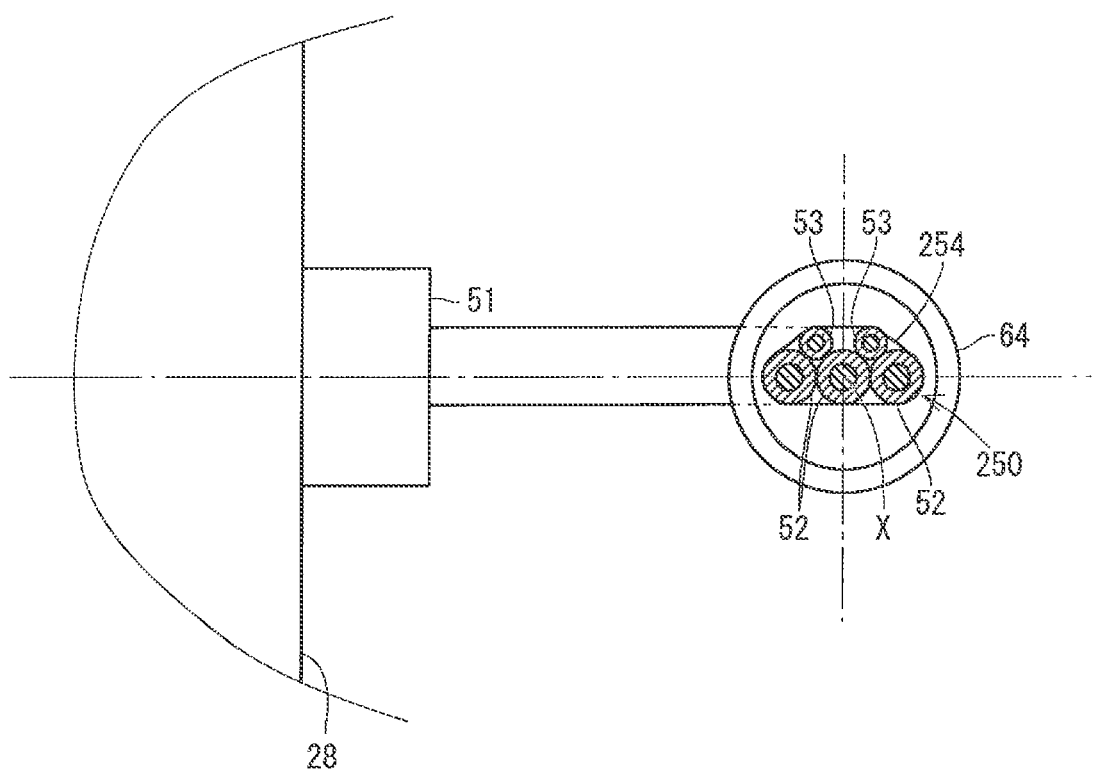

UNDERCARRIAGE WIRING MODULE AND ROUTING STRUCTURE OF UNDERCARRIAGE WIRING MODULE

TECHNICAL FIELD

The present disclosure relates to an undercarriage wiring module and a routing structure of an undercarriage wiring module.

BACKGROUND ART

Patent Document 1 discloses a wiring device supplying an electrical signal from a vehicle body to an in-wheel motor. Patent Document 1 discloses that a wiring needs to follow a rotation of a tire caused by a rotation of a handle, thus the wiring is provided with some slack.

PRIOR ART DOCUMENTS

Patent Document(s)

Patent Document 1: Japanese Patent Application Laid-Open No. 2005-271909

SUMMARY

Problem to be Solved by the Invention

Bending deformation of an undercarriage wiring member is desired to be suppressed in a case where a vehicle wheel is rotated with steering.

Accordingly, an object of the present disclosure is to suppress bending deformation of an undercarriage wiring member in a case where a vehicle wheel is rotated with steering.

Means to Solve the Problem

An undercarriage wiring module according to the present disclosure is an undercarriage wiring module including: a wiring member connecting a vehicle body side apparatus and a vehicle wheel side apparatus; and a support member supporting the wiring member so that the wiring member goes through a steering rotation central axis.

A routing structure of an undercarriage wiring module according to the present disclosure includes a wiring member connecting a vehicle body side apparatus and a vehicle wheel side apparatus, and a part of the wiring member is routed to go through a steering rotation central axis.

Effects of the Invention

According to the present disclosure, bending deformation of an undercarriage wiring member can be suppressed in a case where a vehicle wheel is rotated with steering.

BRIEF DESCRIPTION OF DRAWINGS

FIG. 5 is a schematic cross-sectional view illustrating a wiring member according to a modification example.

DESCRIPTION OF EMBODIMENT(S)

Description of Embodiment of Present Disclosure

Figure 1:
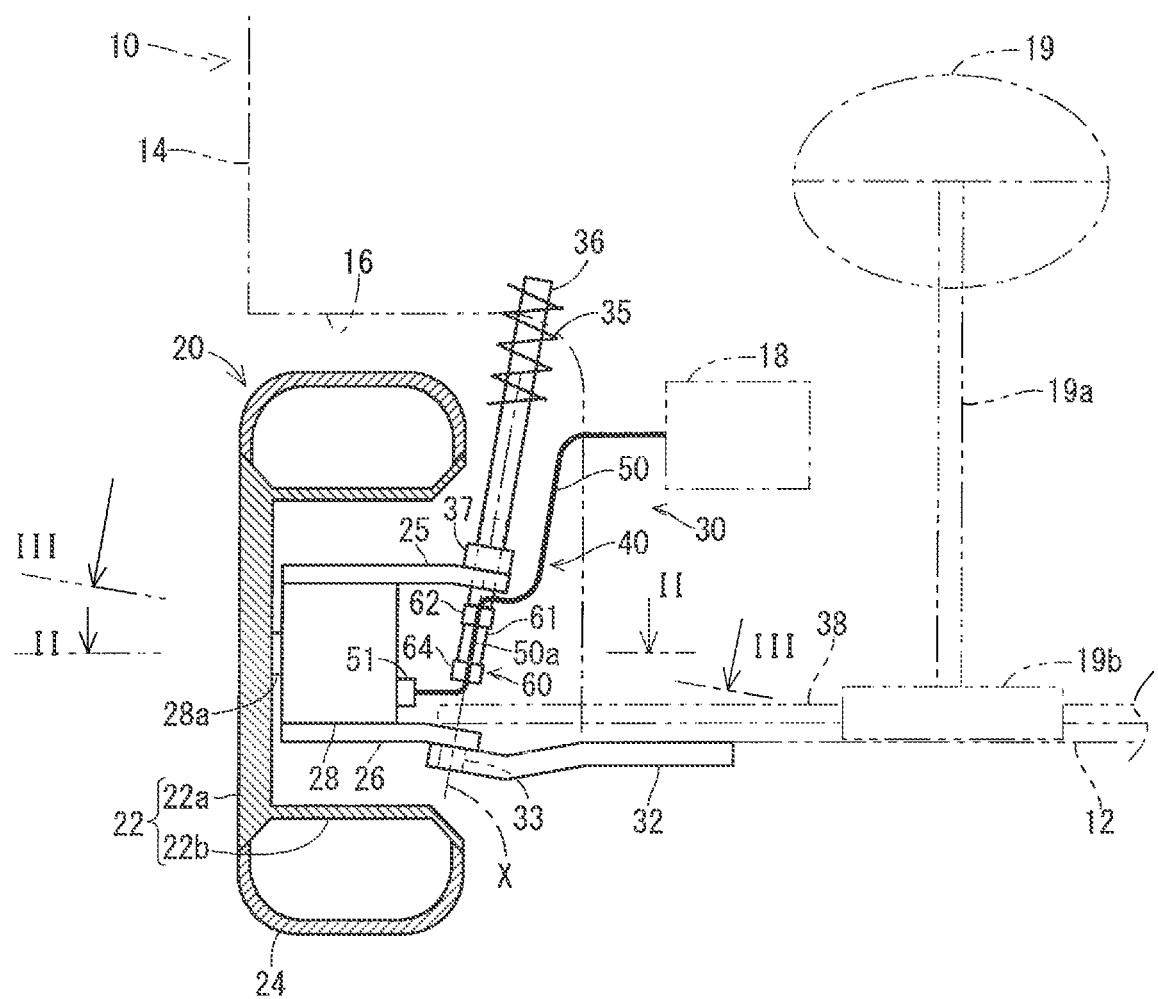
FIG. 1 is a schematic cross-sectional view illustrating a routing structure of an undercarriage wiring module according to an embodiment.

Embodiments of the present disclosure are listed and described firstly.

An undercarriage wiring module according to the present disclosure is as follows.

(1) An undercarriage wiring module includes: a wiring member connecting a vehicle body side apparatus and a vehicle wheel side apparatus; and a support member supporting the wiring member so that the wiring member goes through a steering rotation central axis. In this case, the wiring member goes through the steering rotation central axis. Thus, when a vehicle wheel is rotated with steering, suppressed is a variation of distance from a portion of the wiring member located in the steering rotation central axis to the vehicle wheel side apparatus. Accordingly, bending deformation of the wiring member is suppressed in the case where the vehicle wheel is rotated with steering.

(2) The undercarriage wiring module according to (1), the support member may support the wiring member so that at least a part of the wiring member extends along the steering rotation central axis. A portion of the wiring member extending along the steering rotation central axis can be twisted in accordance with the rotation of the vehicle wheel with steering, thus the bending deformation of the wiring member is suppressed.

(3) The undercarriage wiring module according to (1) or (2), the steering rotation central axis may pass through an area in a minimum inclusion circle in a transverse-sectional surface of the wiring member in a portion of the wiring member going through the steering rotation central axis.

(4) The undercarriage wiring module according to (1) to (3), it is also applicable that the support member includes an upper support part and a lower support part provided in a lower position of the upper support part, and the support member supports the wiring member so that a part of the wiring member goes through the steering rotation central axis between the upper support part and the lower support part. The wiring member can be easily supported to extend along the steering rotation central axis between the upper support part and the lower support part.

(5) The undercarriage wiring module according to (4), the lower support part may support the wiring member while allowing a rotation around the steering rotation central axis. The portion of the wiring member between the upper support part and the lower support part can be easily twisted and deformed in accordance with the rotation of the vehicle wheel by the steering.

(6) The undercarriage wiring module according to (4) or (5), the upper support part may support the wiring member while regulating a rotation around the steering rotation central axis. The twist of the wiring member can be prevented from influencing a side of a vehicle body. This configuration is applied together with the configuration according to the undercarriage wiring module of (4), thus a length of twisting deformation can be increased in a portion of the wiring member extending along the steering rotation central axis.

A routing structure of an undercarriage wiring module according to the present disclosure is as follows.

(7) A routing structure of an undercarriage wiring module includes a wiring member connecting a vehicle body side apparatus and a vehicle wheel side apparatus, and a part of the wiring member is routed to go through a steering rotation central axis. The wiring member is supported to go through the steering rotation central axis. Thus, when the vehicle wheel is rotated with steering, suppressed is a variation of distance from a portion of the wiring member located in the steering rotation central axis to the vehicle wheel side apparatus. Accordingly, bending deformation of the wiring member is suppressed in the case where the vehicle wheel is rotated with steering.

Details of Embodiment of Present Disclosure

An undercarriage wiring module and a routing structure of an undercarriage wiring module according to the present disclosure are described with reference to the drawings. The present disclosure is not limited to these examples, but is indicated by claims, and it is intended that meanings equivalent to claims and all modifications within a scope of claims are included.

Embodiment

Figure 2:
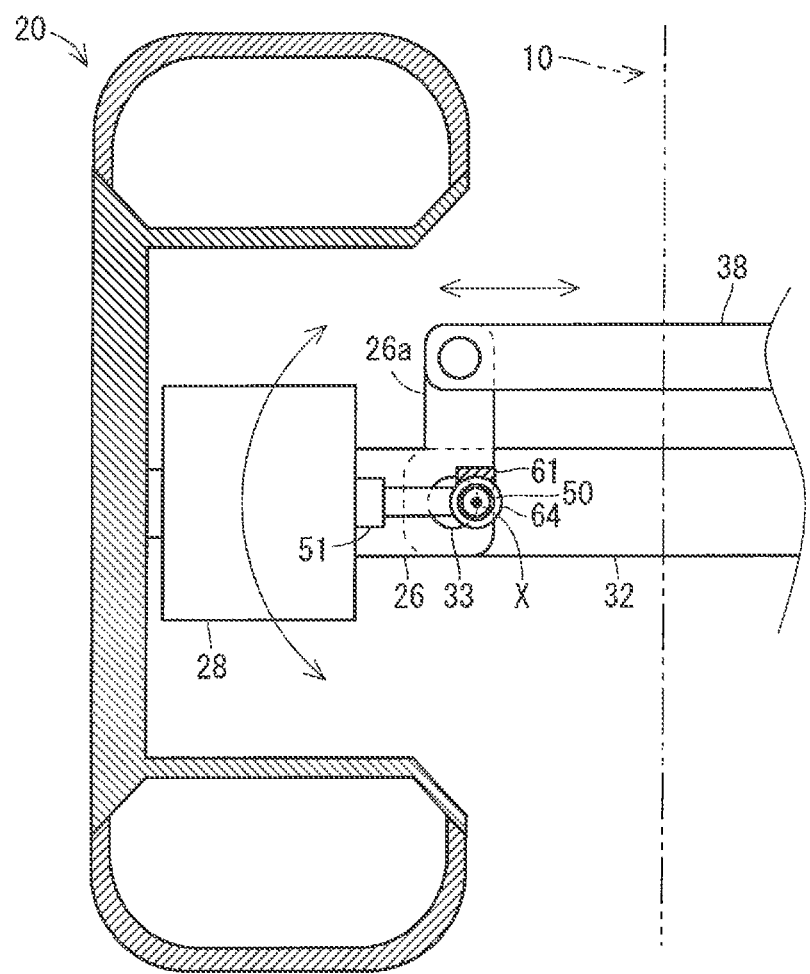
FIG. 2 is a II-II line schematic cross-sectional view in FIG. 1.
Figure 3:
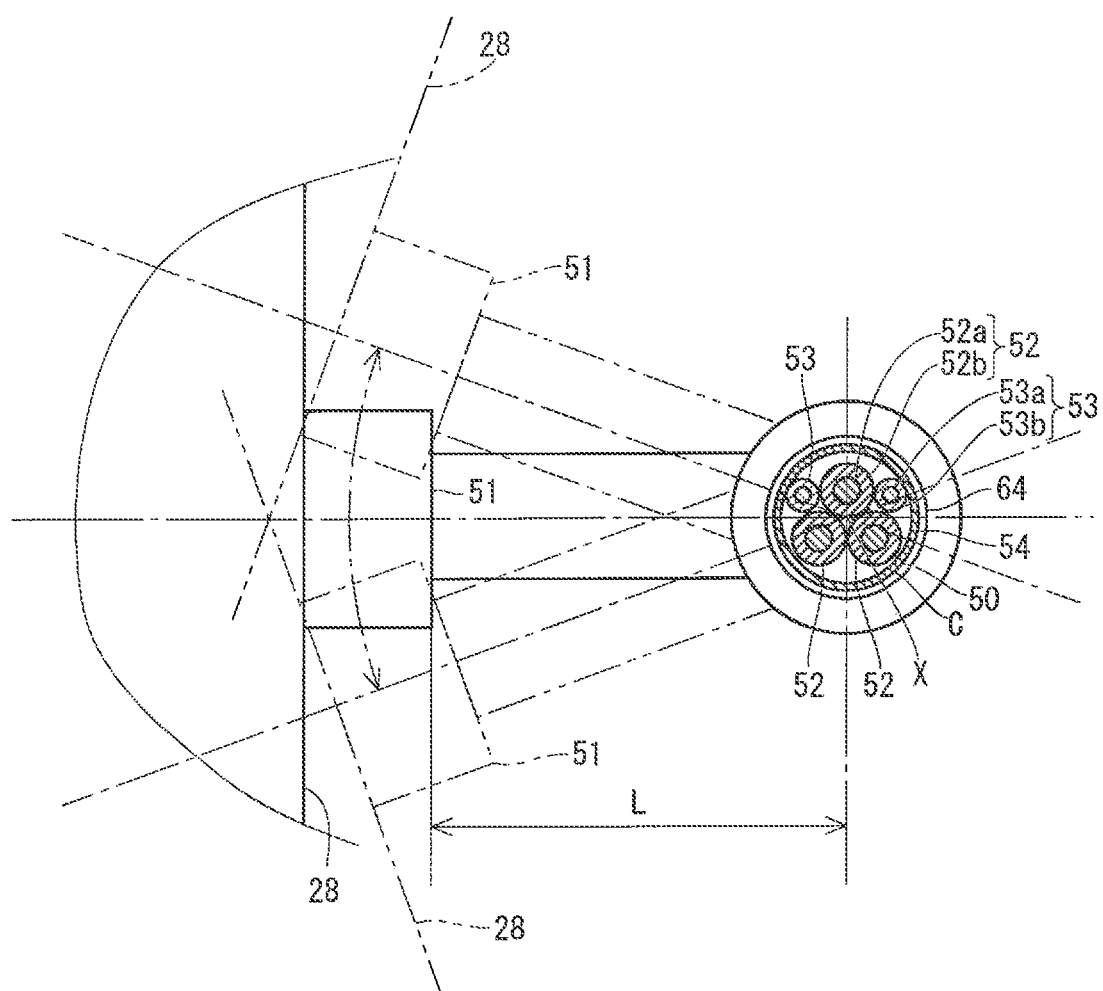
FIG. 3 is a schematic cross-sectional view along a III-Ill line in FIG. 1.

An undercarriage wiring module and a routing structure of an undercarriage wiring module according to an embodiment are described hereinafter. FIG. 1 is a schematic cross-sectional view illustrating a routing structure 30 of an undercarriage wiring module 40. FIG. 1 is a schematic cross-sectional view of a surface perpendicular to a front-back direction of a vehicle body 10 and passing through a central axis of a vehicle wheel 20. FIG. 2 is a II-II line schematic cross-sectional view in FIG. 1. FIG. 3 is a schematic cross-sectional view along a III-III line in FIG. 1. FIG. 2 mainly illustrates a portion around the vehicle wheel 20. FIG. 3 mainly illustrates a relationship between a steering rotation central axis X, a wiring member 50, and a vehicle wheel side apparatus.

The undercarriage wiring module 40 includes the wiring member 50 and a support member 60. The wiring member 50 is a wiring member connecting a vehicle body side apparatus 18 and a vehicle wheel side apparatus 28. The wiring member 50 is routed along a route connecting the vehicle body side apparatus 18 and the vehicle wheel side apparatus 28. The support member 60 is a member supporting the wiring member 50 so that the wiring member 50 is routed along a predetermined route.

A configuration of a portion where the undercarriage wiring module 40 is routed is described for convenience of description.

The vehicle body 10 in which a part of the undercarriage wiring module 40 is routed is a vehicle body of an automobile. FIG. 1 illustrates a portion around the vehicle wheel 20 on a front side in the vehicle body 10. The undercarriage wiring module 40 is assumed to be used for the vehicle wheel 20 steered with steering. For example, the vehicle wheel 20 is a front wheel. The undercarriage wiring module may be used for a rear wheel when the rear wheel is steered.

The vehicle body 10 includes a floor part 12 and a body part 14. The floor part 12 is a portion facing a ground. The body part 14 is provided to an upper side of the floor part 12 to constitute an exterior of the vehicle body 10. The vehicle body 10 may be a monocoque body made up of a frame and a body as rigid bodies integrated with each other, or may have a configuration in which a body is mounted on a frame. In the present embodiment, a travel direction in a case where an automobile normally travels is referred to as a front, and a side opposite thereto is referred to as a back in some cases.

The vehicle wheel 20 is rotatably supported by the vehicle body 10. In the example illustrated in FIG. 1, the vehicle wheel 20 is rotatably supported in a fender apron 16. Any suspension type such as an independent suspension type, for example, may be applied to a suspension device to support the vehicle wheel 20. FIG. 1 illustrates an example that a lower arm 32 and a dumper 36 support the vehicle wheel 20. A suspension device illustrated in FIG. 1 is an example of a strut-type suspension device.

More specifically, the vehicle wheel 20 includes a wheel 22 and a tire 24. The wheel 22 is formed of metal such as iron or aluminum. The wheel 22 includes a disk part 22a and a tire attachment part 22b. The disk part 22a is formed into a circular plate-like shape. The tire attachment part 22b is an annular portion protruding from a surrounding area of the disk part 22a to an inner side in a vehicle width direction. An annular rim protrudes on both side edges of the tire attachment part 22b. The tire 24 formed by an elastic member such as rubber is attached to an outer periphery of the tire attachment part 22b described above.

The vehicle wheel side apparatus 28 is provided to the vehicle wheel 20 described above. Description herein is based on an assumption that the vehicle wheel side apparatus 28 is an in-wheel motor. The in-wheel motor is a motor for traveling incorporated into the vehicle wheel 20 to rotate the vehicle wheel 20. Herein, a shaft 28a of the vehicle wheel side apparatus (in-wheel motor) 28 is connected to a central portion of the disk part 22a while the vehicle wheel side apparatus 28 is disposed in the tire attachment part 22b. Accordingly, the vehicle wheel side apparatus 28 is integrally incorporated into the vehicle wheel 20.

An upper knuckle part 25 and a lower knuckle part 26 are attached to the vehicle wheel side apparatus 28. The upper knuckle part 25 extends toward an inner side in the vehicle width direction from an upper portion of the vehicle wheel side apparatus 28. The lower knuckle part 26 extends toward the inner side in the vehicle width direction from a lower portion of the vehicle wheel side apparatus 28. An arm part 26a receiving force of steering is provided to protrude on the lower knuckle part 26. Herein, the arm part 26a extends backward from the inner side in the vehicle width direction in the lower knuckle part 26. When the vehicle wheel side apparatus 28 is not the in-wheel motor, the upper knuckle part 25 and the lower knuckle part 26 described above extend to the inner side in the vehicle width direction from a bearing part rotatably supporting the vehicle wheel 20 in some cases.

The lower arm 32 is a member formed by metal, for example. A base end portion of the lower arm 32 is swingably supported on the floor part 12 in a position on the inner side in the vehicle width direction of the vehicle wheel 20. The axis as a center of swing of the base end portion of the lower arm 32 extends in a front-back direction of the vehicle body 10. The base end portion of the lower arm may be swingably supported on the floor part on an obliquely front side, an inner side, an obliquely back side, or a back side of the vehicle wheel. In these cases, a rotational axis of the swing of the lower arm may extend in a right-left direction of the vehicle body, a front-back direction, or an oblique direction with respect to both the right-left direction and the front-back direction.

A tip end portion of the lower arm 32 extends toward an inner side of the fender apron 16 (herein, toward an outer side in the vehicle width direction) from the floor part 12. A bearing part 33 is provided to the tip end portion of the lower arm 32. The lower knuckle part 26 is rotatably supported on the tip end portion of the lower arm 32 via the bearing part 33. A rotational axis of the bearing part 33 is the steering rotation central axis X around which the vehicle wheel 20 is rotated in the fender apron 16.

The spring 35 and the dumper 36 are provided between the upper knuckle part 25 and the vehicle body 10. More specifically, an upper end portion of the dumper 36 is supported on the vehicle body 10 on an upper side of the vehicle wheel 20. The upper knuckle part 25 is rotatably supported on the lower end portion of the dumper 36 via a bearing part 37. A rotational axis of the bearing part 37 is the steering rotation central axis X around which the vehicle wheel 20 is rotated in the fender apron 16.

As described above, the base end portion of the lower arm 32 is swingably supported on the floor part 12, thus the lower arm 32 supports the vehicle wheel 20 to be movable in an up-down direction in the fender apron 16. The dumper 36 intervenes between the upper knuckle part 25 and the vehicle body 10 while a movement direction of the vehicle wheel 20 is regulated by the lower arm 32. The dumper 36 and the spring 35 externally mounted to the dumper 36 absorb impact by concave-convex portions of a road surface in traveling.

In the present embodiment, a rotational axis of the bearing part 33 and a rotational axis of the bearing part 37 are located on the steering rotation central axis X of the vehicle wheel 20. A central axis of the dumper 36 is also located on the steering rotation central axis X of the vehicle wheel 20. The central axis of the dumper and the steering rotation central axis X need not coincide with each other.

A tie rod 38 is connected to a tip end portion of the arm part 26a. When a steering wheel 19 is rotated with steering by a driver, a rotational movement thereof is transmitted to the tie rod 38 as a movement in the vehicle width direction via a transmission mechanism 19b such as a steering shaft 19a and a rack-and-pinion mechanism. When the tie rod 38 is moved in the vehicle width direction, the lower knuckle part 26 can be rotated around the rotational axis of the bearing part 33 (that is to say, the steering rotation central axis X). Accordingly, the vehicle wheel 20 can be rotated around the steering rotation central axis X with the steering. A travel direction of the vehicle body 10 is changed by the rotation of the vehicle wheel 20 around the steering rotation central axis X. That is to say, the steering rotation central axis X may be a central axis around which the vehicle wheel 20 is rotated by an operation of the steering wheel 19. The steering rotation central axis X may also be considered an axis closer to a gravity direction than a horizontal direction. The steering rotation central axis X may also be considered a central axis around which the vehicle wheel 20 is rotated to change the travel direction of the vehicle body 10.

The vehicle body side apparatus 18 is provided to a side of the vehicle body 10, and the vehicle wheel side apparatus 28 is provided to a side of the vehicle wheel 20. The vehicle wheel side apparatus 28 is an apparatus incorporated into the vehicle wheel 20 and rotated around the steering rotation central axis X together with the vehicle wheel 20 with respect to the vehicle body 10. As described above, when the vehicle wheel side apparatus 28 is assumed to be the in-wheel motor, the vehicle body side apparatus 18 is assumed to be a drive unit driving the in-wheel motor. For example, when the in-wheel motor is a three-phase induction motor, the vehicle body side apparatus 18 is assumed to be an inverter unit for supplying three-phase alternating current of U phase, V phase, and W phase for driving the in-wheel motor. The vehicle body side apparatus 18 is an apparatus which is provided to the vehicle body 10, and is not rotated even when the vehicle wheel 20 is rotated around the steering rotation central axis X.

The vehicle wheel side apparatus 28 is not necessarily the in-wheel motor. The vehicle wheel side apparatus 28 is assumed to be a sensor or an electrical brake, for example, in place of or in addition to the in-wheel motor. For example, the sensor may be a sensor detecting a rotational speed of a vehicle wheel or a temperature sensor detecting a temperature of an in-wheel motor. The vehicle wheel side apparatus 28 may be an electrical brake including a motor, for example, and performing braking on the rotation of the vehicle wheel 20 using electricity as power. The electrical brake may be an electrical parking brake used in parking or stopping an automobile or a brake used in traveling of an automobile. It is sufficient that the vehicle body side apparatus 18 is an apparatus transmitting or receiving a signal between these vehicle wheel side apparatuses 28 or supplying electrical power. For example, the vehicle body side apparatus 18 may include a function as an electronic control unit (ECU) receiving a signal from a sensor or controlling the electrical brake described above. The vehicle body side apparatus 18 may be provided inside or outside the vehicle body 10. Herein, the vehicle body side apparatus 18 is provided inside the vehicle body 10.

The wiring member 50 includes at least one transmission medium transmitting electrical power or light. One end portion of the wiring member 50 is connected to the vehicle body side apparatus 18. The other end portion of the wiring member 50 is connected to the vehicle wheel side apparatus 28. Herein, the wiring member 50 includes at least one electrical conductor. FIG. 3 illustrates an example that the wiring member 50 includes a power source wire 52 and a signal wire 53. The power source wire 52 is an electrical wire in which a covering 52b is formed around a core wire 52a. The power source wire 52 is a power source wire supplying three-phase alternating current to the in-wheel motor, for example, and FIG. 3 illustrates three power source wires 52. The signal wire 53 is an electrical wire in which a covering 53b is formed around a core wire 53a. The signal wire 53 is a wire transmitting a signal, and is a signal wire for a sensor or control, for example, and FIG. 3 illustrates two signal wires 53. The wiring member 50 may include an optical fiber cable in place of or in addition to an electrical conductor.

The plurality of electrical wires (herein, the power source wire 52 and the signal wire 53) are collected together. Any configuration is applicable to the configuration of collecting the power source wire 52 and the signal wire 53 together. For example, the power source wire 52 and the signal wire 53 may be collected together by a protection member 54. For example, the protection member 54 may be a corrugate tube, an adhesive tape helically wound, a sheath extrusion covered to cover the power source wire 52 and the signal wire 53, or a resin or metal tube. The power source wire 52 and the signal wire 53 need not be collected together by the protection member 54, for example, along a whole longitudinal direction thereof. For example, it is also applicable that the protection member 54 described above is omitted, and the power source wire 52 and the signal wire 53 are collected together by a bracket supporting the wiring member 50 in a constant position. The bracket herein may be the support member 60.

Some or all of the plurality of electrical conductors may be collected together by a covering part which is extrusion covered. For example, the plurality of core wires for electrical power supply may be made up as a cable collected together by the covering part which is extrusion covered.

Any shape is applicable as a transverse-sectional outer shape of the wiring member 50. FIG. 3 illustrates an example that the plurality of power source wires 52 and the signal wire 53 are covered by the protection member 54, and the transverse-sectional outer shape of the wiring member 50 is formed into a circular shape. The transverse-sectional outer shape of the wiring member 50 may be an oval shape or a rectangular shape, for example. The transverse-sectional surface is a cross-sectional surface in a plane perpendicular to an axis of the wiring member 50.

One end portion of the wiring member 50 may be connector-connected to the vehicle body side apparatus 18. The wiring member 50 may be directly drawn from the vehicle body side apparatus 18. One end portion of the wiring member 50 may be connected to the vehicle body side apparatus 18 via the other wiring member.

The other end portion of the wiring member 50 may be connected to the vehicle wheel side apparatus 28 via the connector 51. The other end portion of the wiring member 50 may be directly connected to the vehicle wheel side apparatus 28 without intervention of the connector. The plurality of electrical wires may be branched and connected to the other positions, respectively, in the other portion of the wiring member 50.

The wiring member 50 is routed to go through the steering rotation central axis X. Herein, the support member 60 supports the wiring member 50 so that the wiring member 50 goes through the steering rotation central axis X. Herein, the state where the wiring member 50 goes through the steering rotation central axis X indicates that there is a positional relationship that the steering rotation central axis X goes through an area in a minimum inclusion circle C in at least one transverse-sectional surface of the wiring member 50 in the longitudinal direction. The minimum inclusion circle C is a minimum circle which can include a portion of the wiring member 50 appearing in the transverse-sectional surface. For example, when the transverse-sectional shape of the wiring member 50 is a circular shape, an outer circle of the wiring member 50 appearing in the transverse-sectional surface is the minimum inclusion circle C. The case where the steering rotation central axis X goes through the area in the minimum inclusion circle C includes a case where the steering rotation central axis X goes through a boundary line of the minimum inclusion circle.

It is sufficient that the steering rotation central axis X goes through the area in the minimum inclusion circle C, thus the case where the wiring member 50 goes through the steering rotation central axis X includes a case where the wiring member 50 intersects with the steering rotation central axis X and a case where a part of the wiring member 50 is in a state of extending along the steering rotation central axis X. FIG. 1 illustrates an example that a part 50a of the wiring member 50 is in a state of extending along the steering rotation central axis X. It is sufficient that the steering rotation central axis X goes through the minimum inclusion circle C, thus the central axis of the wiring member 50 and the steering rotation central axis X need not coincide with each other in a portion of the wiring member 50 extending along the steering rotation central axis X.

That is to say, any positional relationship is applicable as long as the steering rotation central axis X goes through the area in the minimum inclusion circle C in the transverse-sectional surface of the wiring member 50 in a portion of the wiring member 50 going through the steering rotation central axis X (intersecting portion) or a portion of the wiring member 50 extending along the steering rotation central axis X.

It is preferable to increase a length of the portion of the wiring member 50 extending along the steering rotation central axis X to suppress bending deformation of the wiring member 50.

The state where the support member 60 supports the wiring member 50 so that the wiring member 50 goes through the steering rotation central axis X includes both cases where the wiring member 50 can be moved and cannot be moved along an extension direction of the steering rotation central axis X while going through the steering rotation central axis X.

Any member is applicable as the support member 60 as long as it supports the wiring member 50 in the routing state described above, and a configuration therefor is not particularly limited. The support member may be a single support member, or may include a plurality of support parts. The support member may be supported on a side of the vehicle body 10 or a side of the vehicle wheel 20. Herein, the state where the support member is supported on the side of the vehicle body 10 indicates that the support member is supported in a portion which is not rotated even when the vehicle wheel 20 is rotated around the steering rotation central axis X. For example, applied is a case where the support member is supported by the dumper 36 or the lower arm 32 described above. The state where the support member 60 is supported on the side of the vehicle wheel 20 indicates that the support member 60 is supported in a portion rotated in accordance with a rotation of the vehicle wheel 20 around the steering rotation central axis X. For example, applied is a case where the support member is supported by the upper knuckle part 25 or the lower knuckle part 26 described above.

In the present embodiment, the support member 60 includes an upper support part 62 and a lower support part 64. The lower support part 64 is provided to a lower side of the upper support part 62. The wiring member 50 is supported by the upper support part 62 and the lower support part 64, thus the wiring member 50 goes through the steering rotation central axis X between the upper support part 62 and the lower support part 64.

More specifically, the upper support part 62 and the lower support part 64 are provided between a tip end portion of the upper knuckle part 25 and a tip end portion of the lower knuckle part 26. The tip end portion of the upper knuckle part 25, the upper support part 62, the lower support part 64, and the tip end portion of the lower knuckle part 26 are arranged in this order from an upper side to a lower side at intervals along the steering rotation central axis X. The upper support part 62 and the lower support part 64 are supported on the tip end portions of the dumper 36 by an extension support part 61. The extension support part 61 detours from the tip end portion of the upper knuckle part 25 while being directed from the lower end portion of the dumper 36 to the lower side in a posture in parallel to the steering rotation central axis X. The extension support part 61 may be fixed to the dumper 36 by welding or screwing, for example. A tip end portion of the extension support part 61 reaches a near side of the tip end portion of the lower knuckle part 26. The upper support part 62 and the lower support part 64 are supported by the dumper 36 via the extension support part 61, thus do not follow the rotation of the vehicle wheel 20 around the steering rotation central axis X. Accordingly, the upper support part 62 and the lower support part 64 are supported on the side of the vehicle body 10.

The upper support part 62 is supported on an intermediate portion in an extension direction of the extension support part 61. The upper support part 62 may be integrally formed with the extension support part 61, or may also be fixed to the extension support part 61 by welding or screwing, for example. The upper support part 62 is provided in a position on the lower side away from the tip end portion of the upper knuckle part 25 along the steering rotation central axis X. In this arrangement position, the upper support part 62 supports a part of the wiring member 50 at a position on the steering rotation central axis X. It is sufficient that the upper support part 62 supports a part of the wiring member 50 in a constant position. For example, the upper support part 62 may be an annular member having a hole into which the wiring member 50 is inserted. The upper support part 62 may have a configuration that a pair of sandwiching pieces are screwed while sandwiching a part of the wiring member 50. The upper support part 62 may have a configuration of having a swaging piece swaged and fixed to a part of the wiring member 50. The upper support part 62 may support a part of the wiring member 50 while regulating a rotation thereof around the steering rotation central axis X. Herein, the state where the upper support part 62 regulates the rotation of the part of the wiring member 50 indicates that the upper support part 62 regulates the rotation of the wiring member 50 more than the lower support part 64. Thus, the upper support part 62 may support the part of the wiring member 50 within a range where the part of the wiring member 50 is hardly rotated dynamically by an action such as friction force, for example, or within a narrow rotation range compared with the lower support part 64. As exemplified in the present embodiment, the upper support part 62 may support a part of the wiring member 50 while stopping the rotation thereof around the steering rotation central axis X.

The lower support part 64 is supported on the tip end portion of the extension support part 61. The lower support part 64 may be integrally formed with the extension support part 61, or may also be fixed to the extension support part 61 by welding or screwing, for example. The lower support part 64 is provided in a position on the lower side away from the upper support part 62 and on the upper side away from the tip end portion of the lower knuckle part 26 along the steering rotation central axis X. In this arrangement position, the lower support part 64 supports a part of the wiring member 50 at a position on the steering rotation central axis X. It is sufficient that the lower support part 64 supports a part of the wiring member 50 in a constant position. For example, the lower support part 64 may have a configuration similar to the upper support part 62 described above.

The lower support part 64 may have a configuration of supporting the wiring member 50 while allowing the rotation thereof around the steering rotation central axis X. For example, FIG. 3 illustrates an example that the lower support part 64 is formed into an annular shape, and an inner diameter thereof is larger than a minimum inclusion circle in a transverse-sectional surface of the other part of the wiring member 50. A gap is formed between the wiring member 50 and an inner peripheral portion of the lower support part 64 in a state where the wiring member 50 is inserted into the lower support part 64. Thus, the wiring member 50 can be rotated in the lower support part 64.

The wiring member 50 extends from the vehicle body side apparatus 18 in the vehicle body 10 to pass through the fender apron 16, and is led toward the tip end portion of the upper knuckle part 25. The wiring member 50 goes through an area between the tip end portion of the upper knuckle part 25 and the upper support part 62, and is supported on the steering rotation central axis X by the upper support part 62. Furthermore, the wiring member 50 is led toward the lower support part 64, and is supported on the steering rotation central axis X by the lower support part 64. A portion of the wiring member 50 between the upper support part 62 and the lower support part 64 is a portion supported along the steering rotation central axis X. Furthermore, the wiring member 50 goes through the area between the lower support part 64 and the tip end portion of the lower knuckle part 26 to extend toward the vehicle wheel side apparatus 28, and is connected to the vehicle wheel side apparatus 28 via the connector 51.

When the lower support part 64 rotatably supports the wiring member 50, twist of the wiring member 50 caused by the rotation of the vehicle wheel 20 around the steering rotation central axis X can be transmitted to the portion of the wiring member 50 between the lower support part 64 and the upper support part 62. When the upper support part 62 supports the wiring member 50 while not allowing the rotation of the wiring member 50, the twist of the wiring member 50 is hardly transmitted to the portion of the wiring member 50 on the side of the vehicle body 10 compared with the upper support part 62.

According to the undercarriage wiring module 40 and the routing structure 30 of the undercarriage wiring module having the above configurations, at least a part of the wiring member 50 is supported at the steering rotation central axis X. Thus, when the vehicle wheel 20 is rotated with steering, suppressed is a variation of distance from a portion of the wiring member 50 located in the steering rotation central axis X to the vehicle wheel side apparatus 28. Accordingly, bending deformation of the wiring member 50 is suppressed in the case where the vehicle wheel 20 is rotated with steering.

A more specific example is described with reference to FIG. 3. In FIG. 3, the vehicle wheel side apparatus 28 and the wiring member 50 directed to the vehicle wheel side apparatus 28 in a case where the vehicle body keeps traveling straight are illustrated by solid lines, and the vehicle wheel side apparatus 28 and the wiring member 50 directed to the vehicle wheel side apparatus 28 in a case where the vehicle body turns left and right are illustrated by alternate long and two short dashes lines. As illustrated in FIG. 3, when the vehicle wheel 20 is rotated around the steering rotation central axis X, the vehicle wheel side apparatus 28 as a connection destination of the wiring member 50 is rotated around the steering rotation central axis X. Thus, a distance from the steering rotation central axis X and the vehicle wheel side apparatus 28 is kept as constant as possible. The wiring member 50 goes through the steering rotation central axis X, and is connected to the vehicle wheel side apparatus 28, thus even when the vehicle wheel 20 is rotated around the steering rotation central axis X, a portion of the wiring member 50 going through the steering rotation central axis X to a portion thereof reaching the vehicle wheel side apparatus 28 keeps having a length L as constant as possible. Thus, force of expanding and shrinking the wiring member 50 hardly acts on the wiring member 50 when the vehicle wheel 20 is rotated with steering, and bending deformation of the wiring member 50 is suppressed.

As a result of suppression of the bending deformation of the wiring member 50, the wiring member 50 has a longer life.

The bending deformation of the wiring member 50 is suppressed, thus there is no need to ensure a space in consideration of the bending deformation around the wiring member 50. Accordingly, a space for routing the wiring member 50 can be reduced as much as possible.

The bending deformation of the wiring member 50 is suppressed, thus the wiring member 50 has hardly contact with a surrounding member due to the bending deformation of the wiring member 50, and the number positions where a protection member of the wiring member 50 is provided can be reduced. Accordingly, the wiring member 50 can be downsized.

The bending deformation of the wiring member 50 is suppressed, thus the number positions where the wiring member 50 is fixed can be reduced. Accordingly, an operation of routing the wiring member 50 is easily performed, and a design for ensuring the fixing position can be easily performed.

When at least a part of the wiring member 50 extends along the steering rotation central axis X, a portion of the wiring member 50 extending along the steering rotation central axis X can be twisted in accordance with the rotation of the vehicle wheel 20 around the steering rotation central axis X. Accordingly, deformation positions caused by the rotation of the vehicle wheel 20 around the steering rotation central axis X are diffused to a wide range, and the wiring member 50 has a longer life.

As a specific example, the wiring member 50 may extend along the steering rotation central axis X between the upper support part 62 and the lower support part 64. Accordingly, the wiring member 50 is easily supported so that a part of the wiring member 50 extends along the steering rotation central axis X.

It is sufficient that the twist of the wiring member 50 caused by the rotation of the vehicle wheel 20 around the steering rotation central axis X is transmitted to the upper side of the support position of the wiring member 50 supported by the lower support part 64 so that the wiring member 50 is twisted and deformed between the upper support part 62 and the lower support part 64. For example, as described above, the lower support part 64 may have the configuration of supporting the wiring member 50 while allowing the rotation thereof around the steering rotation central axis X. Accordingly, the portion of the wiring member 50 between the upper support part 62 and the lower support part 64 can be easily twisted and deformed in accordance with the rotation of the vehicle wheel 20 by the steering.

The support member 60 may support the wiring member 50 so that the twist of the wiring member 50 is not transmitted from the support position supported by the support member 60 to the side of the vehicle body 10. For example, it is also applicable that the upper support part 62 is supported on the side of the vehicle body 10 such as the tip end portion of the dumper 36 and the upper support part 62 supports the wiring member 50 while not allowing the rotation of the wiring member 50 as with the embodiment described above.

When the upper support part 62 supports the wiring member 50 while regulating the rotation thereof around the steering rotation central axis X as with the present embodiment, the twist of the wiring member 50 can be prevented from influencing the side of the vehicle body. The length of the twisting deformation of the part the wiring member 50 extending along the steering rotation central axis X can be increased together with the configuration that the lower support part 64 rotatably supports the wiring member 50.

Modification Example

Various modification examples are described with reference to the embodiment described above.

Figure 4:
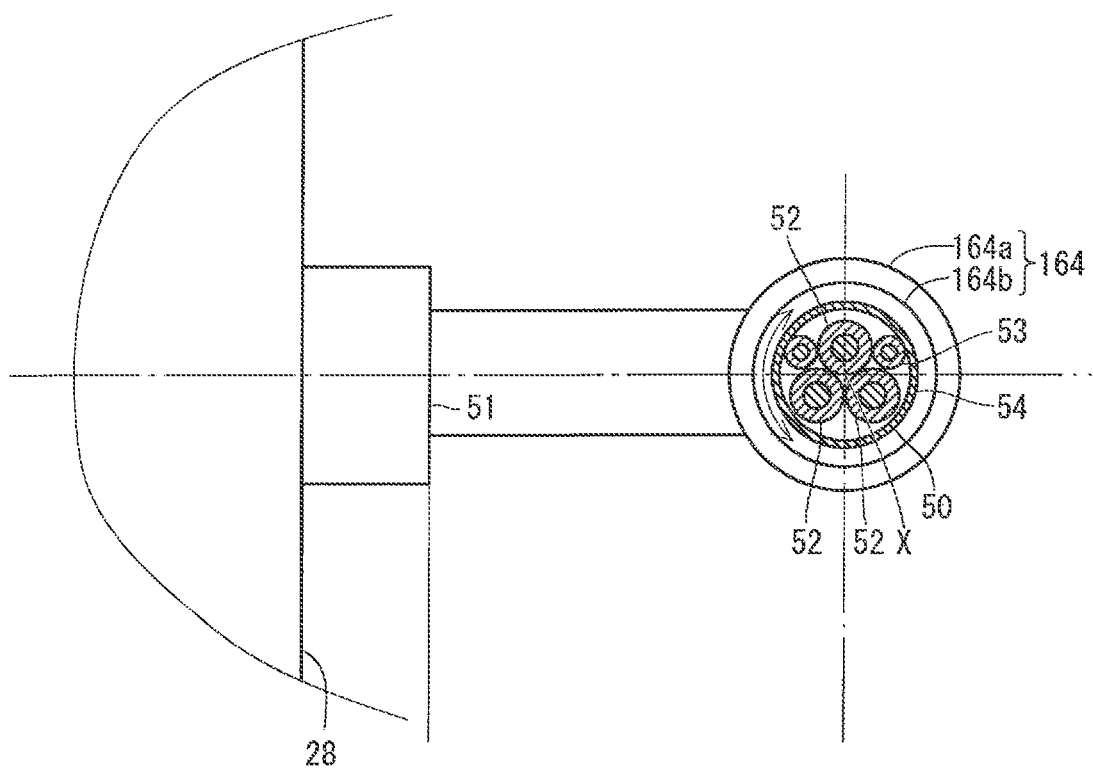
FIG. 4 is a schematic cross-sectional view illustrating a lower support part according to a modification example.

FIG. 4 is a schematic cross-sectional view illustrating a lower support part 164 according to a modification example. FIG. 4 is a cross-sectional view similar to that along the III-III line in FIG. 1. The lower support part 164 is a portion corresponding to the lower support part 64, and supports the wiring member 50 on the lower side of the upper support part 62.

The lower support part 164 includes an outer side body part 164*a* and an inner side rotation support part 164*b*. The outer side body part 164*a* is supported on the dumper 36 by the extension support part 61 described above. Thus, the outer side body part 164*a* is a portion which is not rotated even when the vehicle wheel 20 is rotated around the steering rotation central axis X. The inner side rotation support part 164*b* is rotatably supported on the outer side body part 164*a*. Adopted as the lower support part 164 are various types of bearing structure such as a rolling bearing or a fluid bearing, for example. The inner side rotation support part 164*b* may support the wiring member 50 while allowing the rotation thereof, or may support the wiring member 50 while not allowing the rotation thereof. In the latter case, when the wiring member 50 is twisted, the inner side rotation support part 164*b* is rotated with respect to the outer side body part 164*a*, thus friction hardly occurs between the wiring member 50 and the inner side rotation support part 164*b*.

FIG. 5 is a schematic cross-sectional view illustrating a wiring member 250 according to a modification example. FIG. 5 is a cross-sectional view similar to that along the III-III line in FIG. 1.

The wiring member 250 includes the plurality of (three herein) power source wires 52 and the plurality of (two herein) signal wires 53 in the manner similar to the wiring member 50. The plurality of power source wires 52 are arranged to have a flat band-like shape. The plurality of signal wires 53 is disposed on a side of one surfaces of the plurality of power source wires 52 in a flat state. The plurality of power source wires 52 and the plurality of signal wires 53 are collected together by a protection member 254 so that the plurality of power source wires 52 have a flat band-like shape.

As described above, as with the protection member 54, the protection member 254 may be a corrugate tube, an adhesive tape helically wound, a sheath extrusion covered to cover the power source wire 52 and the signal wire 53, or a resin tube. The power source wire 52 and the signal wire 53 may be collected together by a bracket supporting the wiring member 50 in a constant position. For example, the plurality of core wires 52*a* in the plurality of power source wires 52 may be covered by common resin to constitute one wiring material.

In this manner, the wiring member 250 may have a flat shape so as to be flat in one direction.

Figure 6:
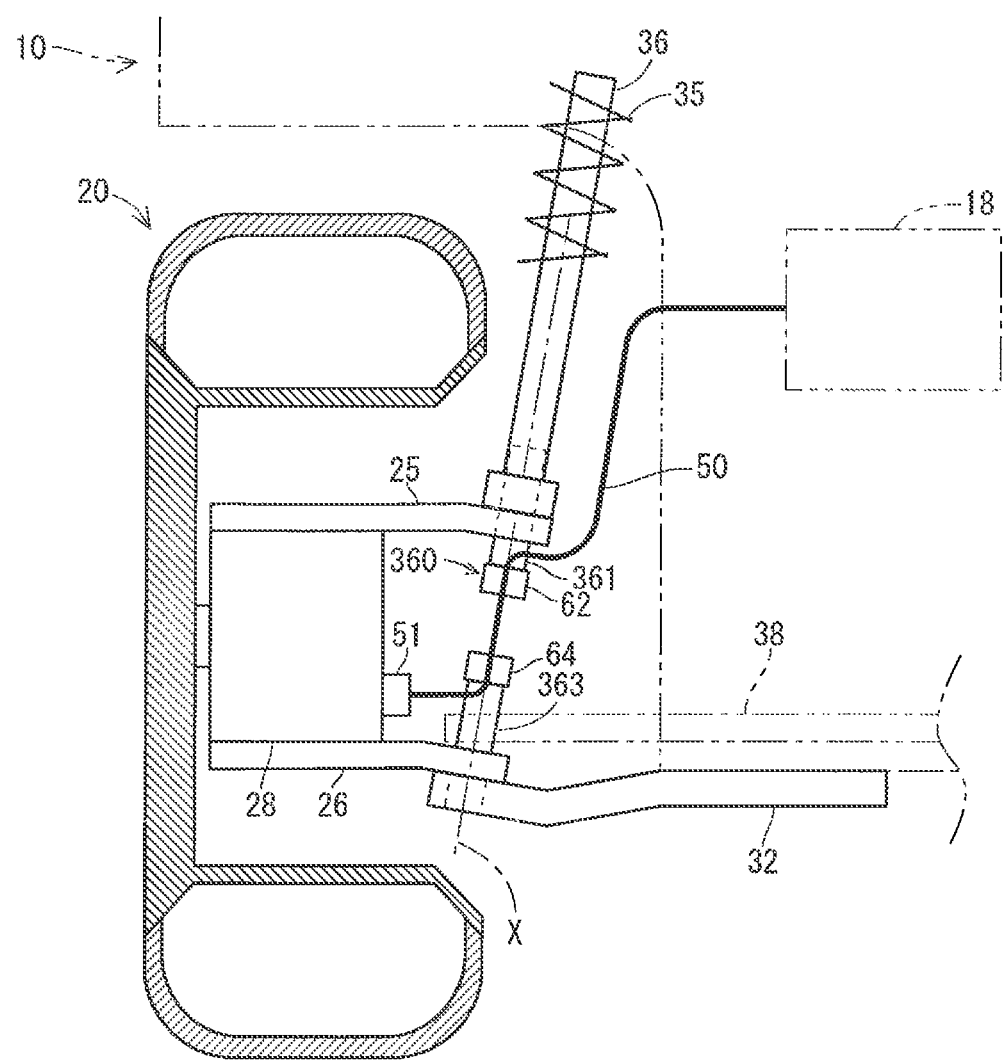
FIG. 6 is a schematic cross-sectional view illustrating a support member according to a modification example.

FIG. 6 is a schematic cross-sectional view illustrating a support member 360 according to a modification example. In the present modification example, an extension support part 361 corresponding to the extension support part 61 supports the upper support part 62 and does not support the lower support part 64 in the support member 360.

The lower support part 64 is supported on the lower knuckle part 26. That is to say, an extension support part 363 is provided to be directed to an upper side along the steering rotation central axis X from the tip end portion of the lower knuckle part 26. The lower support part 64 is supported on the tip end portion of the extension support part 361. The extension support part 361 may be welded or screwed to the lower knuckle part 26 and the lower support part 64, or may also be integrally formed therewith.

In the present modification example, the lower support part 64 is supported on the lower knuckle part 26 via the extension support part 363. Thus, when the vehicle wheel is rotated around the steering rotation central axis X, the lower support part 64 is also rotated around the steering rotation central axis X. Thus, even when the lower support part 64 supports the wiring member 50 while not allowing the rotation thereof in the manner similar to the support structure by the upper support part 62, the wiring member 50 can be twisted between the upper support part 62 and the lower support part 64.

In this case, it is sufficient that the lower support part 64 is supported on the side of the vehicle wheel 20. For example, the lower support part 64 may be supported on the vehicle wheel side apparatus 28, for example, via the other support member. That is to say, the lower support part 64 is rotated around the steering rotation central axis X, thus may also be directly or indirectly supported in a portion which is not rotated around the travel rotational axis.

The configuration that the support member 60 includes the upper support part 62 and the lower support part 64 is not necessary.

Figure 7:
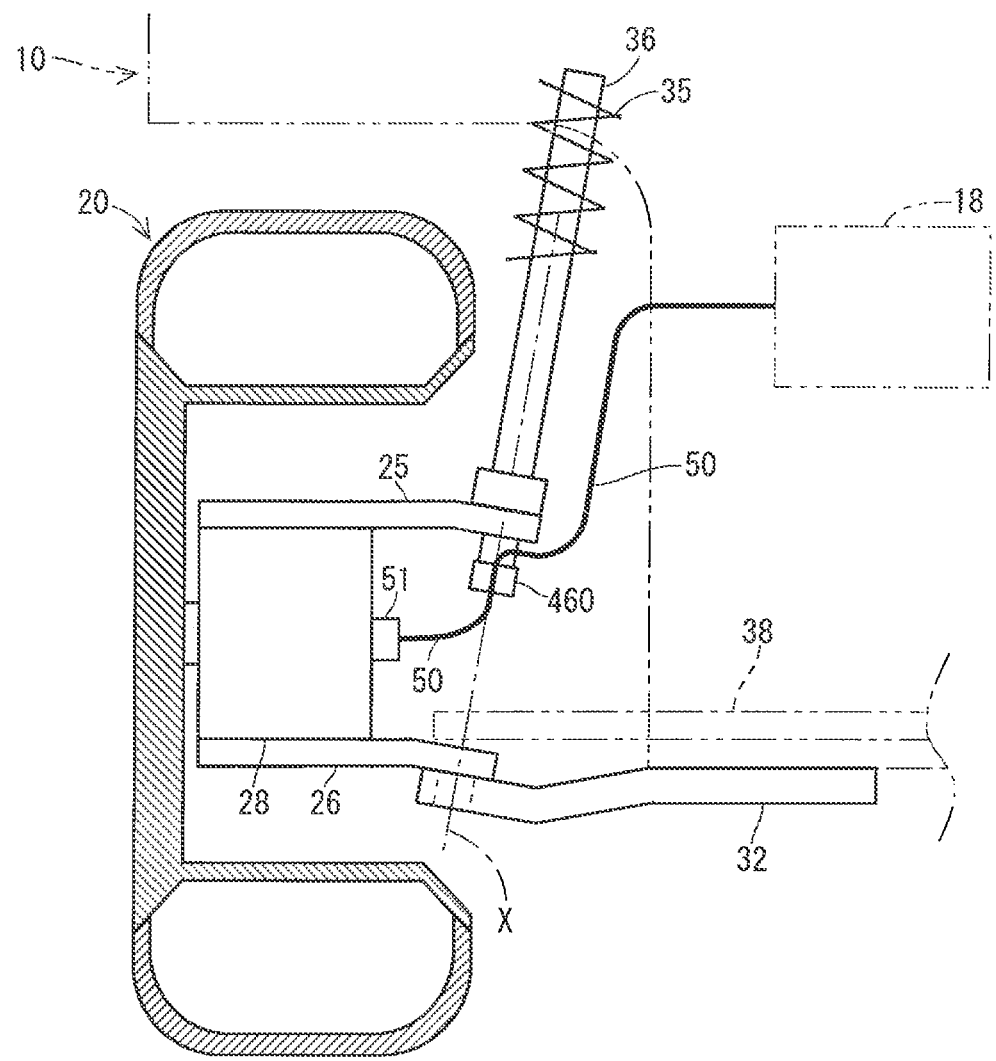
FIG. 7 is a schematic cross-sectional view illustrating a support member according to another modification example.

For example, as illustrated in FIG. 7, the lower support part 64 may be omitted. That is to say, in the present modification example, a support member 460 has a configuration similar to that in the embodiment described above except that the lower support part 64 is omitted. In this case, the wiring member 50 extends from the support member 460 toward the vehicle wheel side apparatus 28 to be connected to the vehicle wheel side apparatus 28.

Also in the present modification example, when the vehicle wheel 20 is rotated with steering, suppressed is a variation of distance from a portion of the wiring member 50 supported on the steering rotation central axis X by the support member 460 to the vehicle wheel side apparatus 28. Accordingly, bending deformation of the wiring member 50 is suppressed in the case where the vehicle wheel 20 is rotated with steering.

Figure 8:
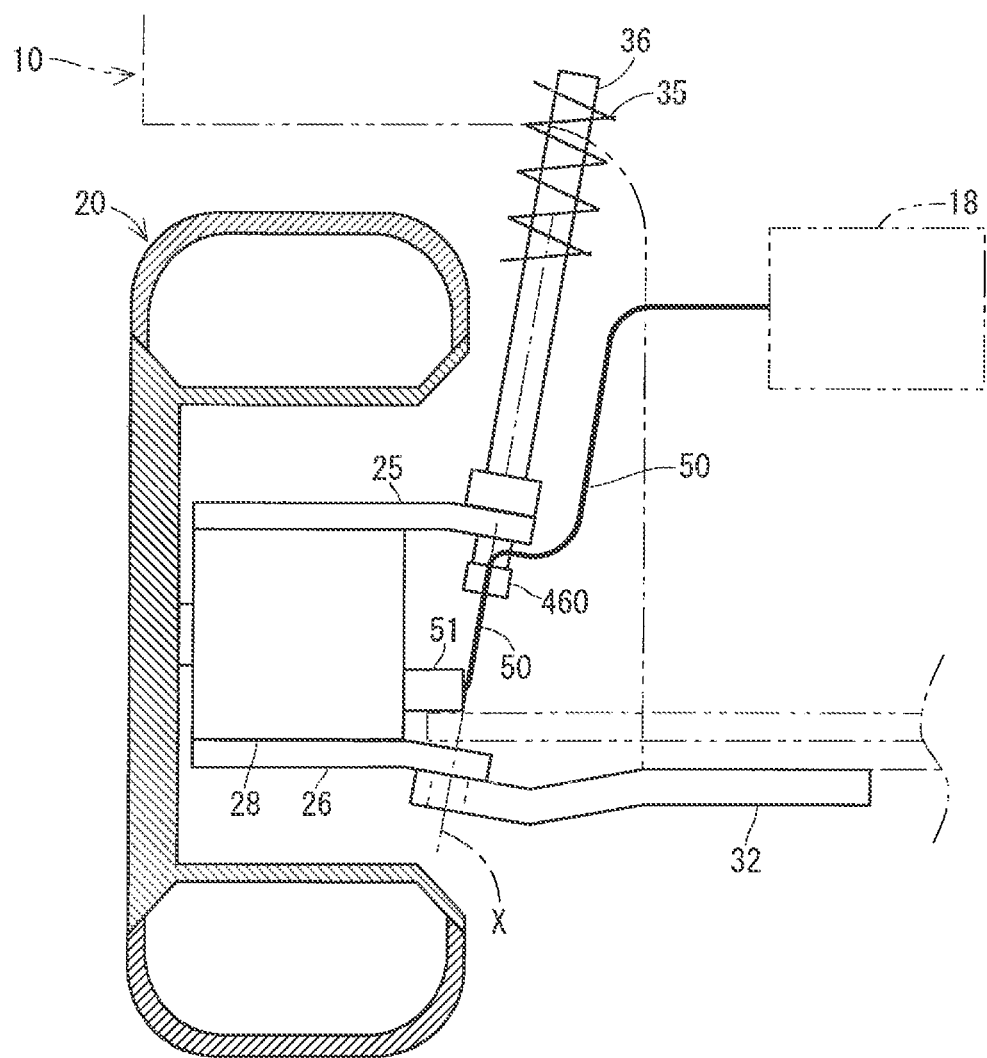
FIG. 8 A schematic cross-sectional plan view illustrating a modification example of regarding a routing position of the wiring member.

In this case, as illustrated in FIG. 8, it is sufficient that a portion of the wiring member 50 connected to the vehicle wheel side apparatus 28 and supported on a constant position is located on the steering rotation central axis X. Herein, the base end portion of the connector 51 connected to the vehicle wheel side apparatus 28 is located on the steering rotation central axis X. A portion of the wiring member 50 entering an inner side of the base end portion of the connector 51 is a portion of the wiring member 50 connected to the vehicle wheel side apparatus 28 and supported on a constant position. The wiring member 50 is directly introduced into the vehicle wheel side apparatus 28 without intervention of the connector. In this case, a portion of the wiring member 50 introduced into the vehicle wheel side apparatus 28 is a portion connected to the vehicle wheel side apparatus 28 and supported on a constant position. A routing position of the wiring member 50 may be achieved by changing the shape of the vehicle wheel side apparatus 28 or a position setting of the steering rotation central axis X with respect to the vehicle wheel 20, for example.

According to the present example, the wiring member 50 can reach the base end portion of the connector 51 along the steering rotation central axis X from the support member 460. Thus, the twisting of the wiring member 50 caused by the rotation of the vehicle wheel 20 around the steering rotation central axis X is diffused to a portion of the wiring member 50 extending along the steering rotation central axis X. Accordingly, the wiring member 50 can have a longer life.

Each configuration described in the embodiment and each modification example can be appropriately combined as long as they are not contradictory.

EXPLANATION OF REFERENCE SIGNS

10 vehicle body
12 floor part
14 body part
16 fender apron
18 vehicle body side apparatus
19 steering wheel
19*a* steering shaft
19*b* transmission mechanism
20 vehicle wheel
22 wheel
22*a* disk part
22*b* tire attachment part
24 tire
25 upper knuckle part
26 lower knuckle part
26*a* arm part
28 vehicle wheel side apparatus
28*a* shaft
30 routing structure
32 lower arm
33 bearing part
35 spring
36 dumper
37 bearing part
38 tie rod
40 undercarriage wiring module
50 wiring member
50*a* part
51 connector
52 power source wire
52*a* core wire
52*b* covering
53 signal wire
53*a* core wire
53*b* covering
54 protection member
60 support member
61 extension support part
62 upper support part
64 lower support part
164 lower support part
164*a* outer side body part
164*b* inner side rotation support part
250 wiring member
254 protection member
360 support member
361 extension support part 363 extension support part
460 support member
C minimum inclusion circle
L constant length
X steering rotation central axis

The invention claimed is:

1. An undercarriage wiring module, comprising:
a wiring member connecting a vehicle body side apparatus and a vehicle wheel side apparatus; and
a support member supporting the wiring member so that the wiring member intersects a steering rotation central axis, the steering rotation central axis being defined by a rotational axis around which a vehicle wheel rotates when steered, wherein,
the support member includes an upper support part and a lower support part provided in a lower position of the upper support part, and
the support member supports the wiring member so that a part of the wiring member goes through the steering rotation central axis between the upper support part and the lower support part
the upper support part supports the wiring member while regulating a rotation of the wiring member around the steering rotation central axis, and
the upper support part regulates the rotation of the wiring member such that twisting of the wiring member is prevented from influencing the vehicle body side apparatus.

2. The undercarriage wiring module according to claim 1, wherein
the support member supports the wiring member so that at least a part of the wiring member extends along the steering rotation central axis.

3. The undercarriage wiring module according to claim 1, wherein
in a portion of the wiring member going through the steering rotation central axis, the steering rotation central axis passes through an area enclosed by a minimum inclusion circle, the minimum inclusion circle being defined as a smallest circle that can encompass a section of the wiring member in a plane perpendicular to a longitudinal axis of the wiring member.

4. The undercarriage wiring module according to claim 1, wherein
the lower support part supports the wiring member while allowing the rotation of the wiring member around the steering rotation central axis.

* * * * *